(12) United States Patent
Aleidan

(10) Patent No.: US 11,438,362 B2
(45) Date of Patent: Sep. 6, 2022

(54) METHOD AND SYSTEM FOR PRIORITIZING AND REMEDIATING SECURITY VULNERABILITIES BASED ON ADAPTIVE SCORING

(71) Applicant: Saudi Arabian Oil Company, Dhahran (SA)

(72) Inventor: Eidan K. Aleidan, Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 217 days.

(21) Appl. No.: 16/732,730

(22) Filed: Jan. 2, 2020

(65) Prior Publication Data

US 2021/0211450 A1  Jul. 8, 2021

(51) Int. Cl.
*H04L 9/00* (2022.01)
*H04L 9/40* (2022.01)

(52) U.S. Cl.
CPC ...... *H04L 63/1433* (2013.01); *H04L 63/1416* (2013.01); *H04L 63/1425* (2013.01); *H04L 63/20* (2013.01)

(58) Field of Classification Search
CPC ............ H04L 63/1433; H04L 63/1416; H04L 63/1425
USPC ........................................................ 726/25
See application file for complete search history.

(56) References Cited

U.S. PATENT DOCUMENTS

| | | | |
|---|---|---|---|
| 7,359,865 B1 * | 4/2008 | Connor | G06Q 40/08 705/7.28 |
| 8,495,747 B1 | 7/2013 | Nakawatase et al. | |
| 8,789,192 B2 | 7/2014 | LaBumbard | |
| 9,411,965 B2 | 8/2016 | Giakouminakis et al. | |
| 9,692,778 B1 * | 6/2017 | Mohanty | G06F 21/50 |
| 2013/0019191 A1 | 7/2013 | Basavapatna et al. | |
| 2017/0046519 A1 * | 2/2017 | Cam | G06F 21/577 |
| 2018/0003273 A1 | 2/2018 | Inagaki et al. | |

(Continued)

OTHER PUBLICATIONS

Leftkowitz, Josh. "Risk-Based Vulnerability Management is a Must for Security & Compliance" SecurityWeek, Jul. 1, 2019, www.securityweek.com/risk-based-vulnerability-management-must-security-compliance.

(Continued)

*Primary Examiner* — Christopher J Brown
(74) *Attorney, Agent, or Firm* — Leason Ellis LLP

(57) ABSTRACT

A system, a method, and a computer program for remediating a vulnerability on a computing resource asset located in a computer network that has a plurality of other computing resource assets each having at last one vulnerability, where a Common Vulnerability Scoring System (CVSS) score is determined for the vulnerability. Vulnerability scanning results data corresponding to the computing resource asset can be analyzed and an environmental factor weighting score value determined for each of a plurality of environmentally-dependent factors. The environmental factor weighting score values and CVSS score can be aggregated and an adjusted environmental factor weighting score aggregate value generated. A prioritization score value for the vulnerability on the computing resource asset can be determined based on the adjusted environmental factor weighting score aggregate value and the vulnerability remediated on each of the computing resource assets according to the prioritization score value.

17 Claims, 7 Drawing Sheets

(56) References Cited

U.S. PATENT DOCUMENTS

| | | | |
|---|---|---|---|
| 2018/0035198 A1 | 2/2018 | Patel et al. | |
| 2018/0211047 A1 | 7/2018 | Olson et al. | |
| 2018/0351987 A1* | 12/2018 | Patel | G06F 21/577 |
| 2019/0238584 A1 | 8/2019 | Somasundaram et al. | |
| 2021/0075814 A1* | 3/2021 | Bulut | G06N 3/08 |

OTHER PUBLICATIONS

"CVSS v3 1 Specification Document." FIRST, www.first.org/cvss/specification-document.
International Search Report and Written Opinion in Corresponding PCT Application No. PCT/US2020/0627273 dated Mar. 29, 2021. 12 pages.

\* cited by examiner

_50_

| FACTOR | CATEGORY | SCORE VALUE |
|---|---|---|
| ENVF | PRODUCTION | 2 |
| | NON-PRODUCTION | 1 |
| NETF | EXTRA NET | 3 |
| | INTRANET | 2 |
| | SEPARATE NETWORK | 1 |
| CRIF | CRITICAL | 3 |
| | MEDIUM | 2 |
| | LOW | 1 |
| CONF | HIGH | 2 |
| | MEDIUM | 1 |
| | LOW | 0 |
| INTF | HIGH | 2 |
| | MEDIUM | 1 |
| | LOW | 0 |
| AVAF | HIGH | 2 |
| | LOW | 1 |
| | NONE | 0 |
| URGF | HIGH | 2 |
| | LOW | 1 |
| CVSS | CVSS SCORE | 10 |

FIG. 5

| FACTOR | CATEGORY | SCORE VALUE |
|---|---|---|
| ENVF | NON-PRODUCTION | 1 |
| NETF | SEPARATE NETWORK | 1 |
| CRIF | LOW | 1 |
| CONF | LOW | 0 |
| INTF | LOW | 0 |
| AVAF | NONE | 0 |
| URGF | LOW | 1 |
| CVSS | CVSS SCORE | 10 |

FIG. 6

METHOD AND SYSTEM FOR PRIORITIZING AND REMEDIATING SECURITY VULNERABILITIES BASED ON ADAPTIVE SCORING

FIELD OF THE DISCLOSURE

The present disclosure relates to a cybersecurity solution that includes a system, method and computer program for prioritizing and remediating security vulnerabilities in a computer network based on adaptive scoring.

BACKGROUND OF THE DISCLOSURE

The Internet is a worldwide network of interconnected computer networks that use the Transmission Control Protocol/Internet Protocol (TCP/IP) to link communicating devices worldwide. The Internet includes private, public, academic, business, and government networks, all of which are interlinked by arrays of electronic, wireless, wired, or optical networking technologies. The Internet carries a broad range of information resources and services, including the World Wide Web (WWW), electronic mail, telephony, and file sharing. As the Internet evolves and network systems become increasingly under attack, cybersecurity solutions are taking on ever-greater importance. However, existing cybersecurity solutions have significant shortcomings, which are addressed by the technology solution provided in this disclosure.

SUMMARY OF THE DISCLOSURE

The disclosure provides a cybersecurity solution, including a method, a system, and a computer program for prioritizing and remediating security vulnerabilities in a computer network based on adaptive scoring. In a nonlimiting embodiment of the solution, a method is provided for remediating a vulnerability on a computing resource asset located in a computer network that has a plurality of other computing resource assets each having at last one vulnerability, where a Common Vulnerability Scoring System (CVSS) score is determined for said vulnerability. The method comprises: receiving vulnerability scanning results data corresponding to said computing resource asset and the plurality of other computing resource assets on the computer network, the vulnerability scanning results data including said vulnerability and the CVSS score; analyzing the vulnerability scanning results data with respect to each of a plurality of environmentally-dependent factors for said computing resource asset or the computer network; determining an environmental factor weighting score value for each of the plurality of environmentally-dependent factors; aggregating the environmental factor weighting score values for the plurality of environmentally-dependent factors and the CVSS score to generate an adjusted environmental factor weighting score aggregate value; determining a prioritization score value for said vulnerability on the computing resource asset based on the adjusted environmental factor weighting score aggregate value; and remediating said vulnerability on the computing resource asset and the vulnerabilities on each of the plurality of other computing resource assets according to the prioritization score value.

In the method, the determining the prioritization score value can comprise calculating an aggregate maximum score value ($CSV_{Max}$) by adding a maximum value attainable for the CVSS score and all environmentally-dependent factors, and calculating the prioritization score value by normalizing the adjusted environmental factor weighting score aggregate value, wherein normalizing the adjusted environmental factor weighting score aggregate value includes dividing the adjusted environmental factor weighting score aggregate value by the aggregate maximum score value.

In the method, the plurality of environmentally-dependent factors comprise at least one of: an environmental factor (ENVF); a network connectivity factor (NETF); a criticality factor (CRIF); a confidentiality factor (CONF); an integrity factor (INTF); an availability factor (AVAF); and an urgency factor (URGF).

In the method, the prioritization score value is determined according to $$SV_{Total} = \Sigma(SV_{ENVF} + SV_{NETF} + SV_{CRIF} + SV_{CONF} + SV_{INTF} + SV_{AVAF} + SV_{URGF} + SV_{CVSS})/\Sigma CSV_{Max} \times 100,$$

where $SV_{Total}$ is the prioritization score value, $SV_{ENVF}$ is an environmental factor (ENVF) score value, $SV_{NETF}$ is a network connectivity factor (NETF) score value, $SV_{CRIF}$ is a criticality factor (CRIF) score value, $SV_{CONF}$ is a confidentiality factor (CONF) score value, $SV_{INTF}$ is an integrity factor (INTF) score value, $SV_{AVAF}$ is an availability factor (AVAF) score value, $SV_{URGF}$ is an urgency factor (URGF) score value, and $SV_{CVSS}$ is a Common Vulnerability Scoring System (CVSS) score value.

In the method, remediating the vulnerability on the computing resource asset and the vulnerabilities on each of the plurality of other computing resource assets according to the prioritization score value can include sending remediation instructions or data to a communicating device on the computer network.

In the method, the communicating device can be arranged to interact with a user.

In the method, each of the plurality of environmentally-dependent factors can comprise at least two categories.

In the method, each of the plurality of environmentally-dependent factors can comprise at least two categories, wherein the environmental factor (ENVF) can comprise a production category and a non-production category; the network connectivity factor (NETF) can comprise an extranet category, an intranet category and a separate network category; and each of the criticality factor (ORIF), confidentiality factor (CONF), integrity factor (INTF), and availability factor (AVAF) can comprise at least three categories.

In another nonlimiting embodiment of the solution, a system is provided for remediating a vulnerability on a computing resource asset located in a computer network that has a plurality of other computing resource assets each having at last one vulnerability, where a Common Vulnerability Scoring System (CVSS) score is determined for the vulnerability. The system comprises an environmental factor weighting (EFW) determiner suite arranged to: receive vulnerability scanning results data corresponding to said computing resource asset and the plurality of other computing resource assets on the computer network, the vulnerability scanning results data including said vulnerability and the CVSS score; analyze the vulnerability scanning results data with respect to each of a plurality of environmentally-dependent factors for said computing resource asset or the computer network; and, determine an environmental factor weighting score value for each of the plurality of environmentally-dependent factors. The system further comprises a vulnerability remediator arranged to: aggregate the environmental factor weighting score values for the plurality of environmentally-dependent factors and the CVSS score to generate an adjusted environmental factor weighting score aggregate value; determine a prioritization score value for said vulnerability on the computing resource asset based on the adjusted environmental factor weighting score aggregate value; and, remediate said vulnerability on the computing resource asset and the vulnerabilities on each of the plurality of other computing resource assets according to the prioritization score value.

In the system, the environmental factor weighting (EFW) determiner suite can comprise at least one of: an environmental factor (ENVF) determiner; a network connectivity factor (NETF) determiner; a criticality factor (ORIF) determiner; a confidentiality factor (CONF) determiner; an integrity factor (INTF) determiner; an availability factor (AVAF) determiner; and an urgency factor (URGF) determiner.

In the system, the vulnerability remediator can be arranged to determine the prioritization score value by: calculating an aggregate maximum score value ($CSV_{Max}$) by adding a maximum value attainable for the CVSS score and all environmentally-dependent factors; and calculating the prioritization score value by normalizing the adjusted environmental factor weighting score aggregate value, wherein normalizing the adjusted environmental factor weighting score aggregate value includes dividing the adjusted environmental factor weighting score aggregate value by the aggregate maximum score value.

In the system, the vulnerability remediator can be arranged to determine the prioritization score value according to $$SV_{Total} = \Sigma(SV_{ENVF} + SV_{NETF} + SV_{CRIF} + SV_{CONF} + SV_{INTF} + SV_{AVAF} + SV_{URGF} + SV_{CVSS})/\Sigma CSV_{Max} \times 100,$$

where $SV_{Total}$ is the prioritization score value, $SV_{ENVF}$ is an environmental factor (ENVF) score value, $SV_{NETF}$ is a network connectivity factor (NETF) score value, $SV_{CRIF}$ is a criticality factor (ORIF) score value, $SV_{CONF}$ is a confidentiality factor (CONF) score value, $SV_{INTF}$ is an integrity factor (INTF) score value, $SV_{AVAF}$ is an availability factor (AVAF) score value, $SV_{URGF}$ is an urgency factor (URGF) score value, and $SV_{CBSS}$ is a Common Vulnerability Scoring System (CVSS) score value.

In the system, the vulnerability remediator can be arranged to send remediation instructions or data to a communicating device on the computer network to remediate the vulnerability on the computing resource asset and the vulnerabilities on each of the plurality of other computing resource assets according to the prioritization score value.

In the system, the communicating device can be arranged to interact with a user.

In the system, each of the plurality of environmentally-dependent factors can comprise at least two categories.

In the system, each of the plurality of environmentally-dependent factors can comprise at least two categories, wherein: the environmental factor (ENVF) can comprise a production category and a non-production category; the network connectivity factor (NETF) can comprise an extranet category, an intranet category and a separate network category; and each of the criticality factor (ORIF), confidentiality factor (CONF), integrity factor (INTF), and availability factor (AVAF) can comprise at least three categories.

In a further nonlimiting embodiment of the solution a non-transitory computer readable storage medium is provided, storing computer program instructions that, when executed by a security appliance, remediate a vulnerability on a computing resource asset located in a computer network that has a plurality of other computing resource assets each having at least one vulnerability, where a Common Vulnerability Scoring System (CVSS) score is determined for the vulnerability. The computer program instructions comprise: receiving vulnerability scanning results data corresponding to said computing resource asset and the plurality of other computing resource assets on the computer network, the vulnerability scanning results data including said vulnerability and the CVSS score; analyzing the vulnerability scanning results data with respect to each of a plurality of environmentally-dependent factors for said computing resource asset or the computer network; determining an environmental factor weighting score value for each of the plurality of environmentally-dependent factors; aggregating the environmental factor weighting score values for the plurality of environmentally-dependent factors and the CVSS score to generate an adjusted environmental factor weighting score aggregate value; determining a prioritization score value for said vulnerability on the computing resource asset based on the adjusted environmental factor weighting score aggregate value; and remediating said vulnerability on the computing resource asset and the vulnerabilities on each of the plurality of other computing resource assets according to the prioritization score value.

In the non-transitory computer readable storage, the plurality of environmentally-dependent factors can comprise at least one of: an environmental factor (ENVF); a network connectivity factor (NETF); a criticality factor (ORIF); a confidentiality factor (CONF); an integrity factor (INTF); an availability factor (AVAF); and an urgency factor (URGF).

In the non-transitory computer readable storage, the determining the prioritization score value can comprise: calculating an aggregate maximum score value ($CSV_{Max}$) by adding a maximum value attainable for the CVSS score and all environmentally-dependent factors; and calculating the prioritization score value by normalizing the adjusted environmental factor weighting score aggregate value, wherein normalizing the adjusted environmental factor weighting score aggregate value includes dividing the adjusted environmental factor weighting score aggregate value by the aggregate maximum score value.

In the non-transitory computer readable storage medium, the prioritization score value can be determined according to $$SV_{Total} = \Sigma(SV_{ENVF} + SV_{NETF} + SV_{CRIF} + SV_{CONF} + SV_{INTF} + SV_{AVAF} + SV_{URGF} + SV_{CVSS})/\Sigma CSV_{Max} \times 100,$$

where $SV_{Total}$ is the prioritization score value, $SV_{ENVF}$ is an environmental factor (ENVF) score value, $SV_{NETF}$ is a network connectivity factor (NETF) score value, $SV_{CRIF}$ is a criticality factor (ORIF) score value, $SV_{CONF}$ is a confidentiality factor (CONF) score value, $SV_{INTF}$ is an integrity factor (INTF) score value, $SV_{AVAF}$ is an availability factor (AVAF) score value, $SV_{URGF}$ is an urgency factor (URGF) score value, and $SV_{CVSS}$ is a Common Vulnerability Scoring System (CVSS) score value.

Additional features, advantages, and embodiments of the disclosure may be set forth or apparent from consideration of the detailed description and drawings. Moreover, it is to be understood that the foregoing summary of the disclosure and the following detailed description and drawings provide non-limiting examples that are intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description explain the principles of the disclosure. No attempt is made to show structural details of the disclosure in more detail than may be necessary for a fundamental understanding of the disclosure and the various ways in which it may be practiced.

FIG. 5 shows a nonlimiting example of a table having factor score values that can be determined by the ANS appliance shown in FIG. 4.

FIG. 6 shows a nonlimiting example of an implementation of the table shown in FIG. 5.

Figure 1:
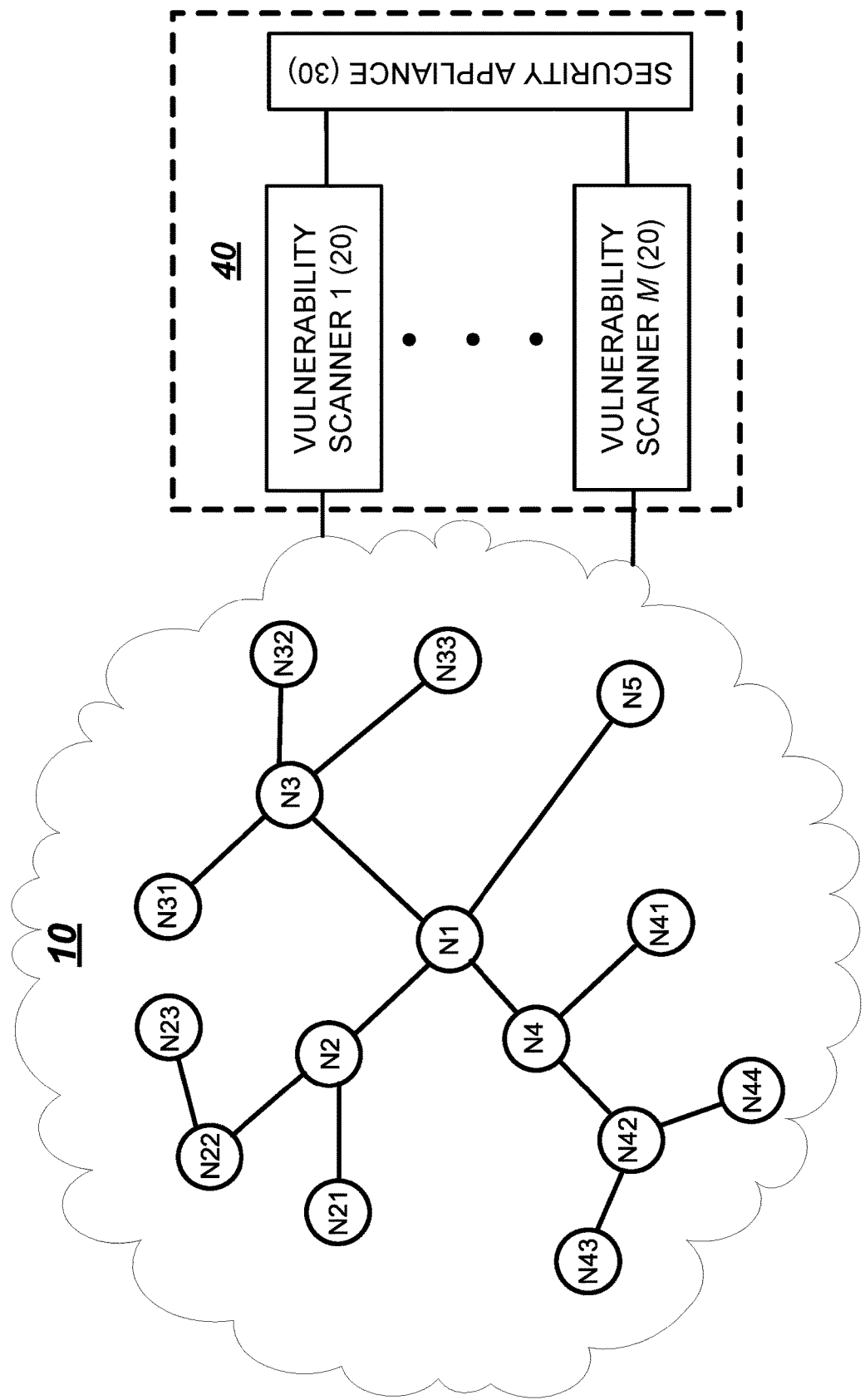
FIG. 1 shows a nonlimiting example of an environment provided with a cybersecurity solution according to the principles of the disclosure.

The present disclosure is further described in the detailed description that follows.

DETAILED DESCRIPTION OF THE DISCLOSURE

The disclosure and its various features and advantageous details are explained more fully with reference to the non-limiting embodiments and examples that are described or illustrated in the accompanying drawings and detailed in the following description. It should be noted that features illustrated in the drawings are not necessarily drawn to scale, and features of one embodiment can be employed with other embodiments as those skilled in the art would recognize, even if not explicitly stated. Descriptions of well-known components and processing techniques can be omitted so as to not unnecessarily obscure the embodiments of the disclosure. The examples used are intended merely to facilitate an understanding of ways in which the disclosure can be practiced and to further enable those skilled in the art to practice the embodiments of the disclosure. Accordingly, the examples and embodiments should not be construed as limiting the scope of the disclosure. Moreover, it is noted that like reference numerals represent similar parts throughout the several views of the drawings.

Computer networks are continuously exposed to cyber-attack threats, many of which can be catastrophic to a computer network, network users or the entity that owns, controls, manages or has valuable computer (or computing) resource assets on the network, if successfully exploited. In computer networks with large footprints of computer resource assets, identification or assessment of security vulnerabilities can be a daunting task. This is because large computer networks typically have large numbers of diverse computer resource assets, including servers, workstations, network devices, security appliances, IoT ("Internet of Things") devices, cameras, printers, software, middleware and temporarily connected communicating devices. The problem can become exasperated further as the number of discovered vulnerabilities increases daily, presenting information technology (IT) security teams with major or impossible challenges in addressing all discovered vulnerabilities and staying on top of their vulnerability management programs. The problem can be compounded by many times if the computer network is distributed with computer resource assets located in different geographic locations or regions, such as, for example, with distributed systems.

Computer networks typically use numerous off-the-shelf vulnerability scanners (or vulnerability scanning tools) to conduct vulnerability assessments of computer resource assets in large enterprise networks. However, such vulnerability scanners tend to be network-agnostic, treating similar vulnerabilities in similar ways, regardless of the specific security posture or IT infrastructure of the computer network where the vulnerabilities exist. Therefore, there exists an urgent need for a cybersecurity solution that can assess network security posture or IT infrastructure and accurately and effectively identify those vulnerabilities that are most critical or important to the particular computer network being assessed, so that the most critical or important vulnerabilities can be timely remediated, before they can be exploited to cause damage to the computer network or computer resource assets that are connected to the network.

A cybersecurity flaw is often referred to in the cybersecurity industry as a "vulnerability" or "security vulnerability," and it is defined in the ISO/IEC 27002 information security standard as "a weakness of an asset or group of assets that can be exploited by one or more threats." The ISO/IEC 27002 standard is published by the International Organization for Standardization (ISO) and the International Electrotechnical Commission (IEC). A system that is commonly employed to identify and assess principal characteristics of vulnerabilities in computing resource assets is the Common Vulnerability Scoring System (CVSS), which is the result of research carried out by the National Infrastructure Advisory Council (NIAC).

The CVSS is a free and open industry standard for assessing the severity of computer system security vulnerabilities. CVSS produces and assigns numerical scores to vulnerabilities in computing resource assets. Scores are typically between 0 and 10, with 10 being representative of the most severe vulnerabilities. Its quantitative model ensures repeatable accurate measurement while enabling visibility into the underlying vulnerability characteristics that were used to generate the scores. CVSS scores can be used to calculate the risks associated with the vulnerabilities, as well as to prioritize remediation efforts. However, when the number of detected vulnerabilities is high, CVSS scores can be ambiguous and may not reflect the true risks associated with the vulnerabilities.

In an effort to prioritize security vulnerabilities, many off-the-shelf vulnerability scanning tools tag each vulnerability with a CVSS score, assigning a severity score value of between 1 and 10. However, because such scanning tools are designed to be used with most enterprise networks, which can have significantly different types of security postures, IT infrastructures, enterprise risk tolerances, security vulnerabilities, or computer resource assets, such tools tend to assign high CVSS scores to a substantial percentage of identified vulnerabilities. For instance, in 2018, according to some sources, more than 22000 vulnerabilities were identified, with 33% of them rated as having a CVSS score of 7 or higher. Since the CVSS assigns a severity score to the vulnerability without weighing factors or circumstances that might be unique to the particular environment in which the computer resource asset is being used, the number of vulnerabilities for most computer networks can be overwhelming and, as a result, can leave critical vulnerabilities unresolved and vulnerable to exploitation. Therefore, there exists an immediate and urgent unfulfilled need for a cybersecurity solution that can adapt to the particular environment in which it is used, and that does not rely solely on CVSS scoring, so as to provide accurate assessments and prioritization of those vulnerabilities that might be most critical to that environment.

This disclosure provides a cybersecurity solution that addresses the above urgent and unfulfilled need. The cybersecurity solution can adapt to each computer network and account for any IT infrastructure differences, providing adaptive prioritization or remediation that can be tailored to each unique environment in which the solution is implemented. The cybersecurity solution includes, among other things, an environment-dependent weighting solution that can adapt to the particular environment in which it is used, including the organization or enterprise network in the environment. The cybersecurity solution includes an adaptive network security solution that includes network-specific adaptive weighting complemented with CVSS scoring to prioritize vulnerabilities for timely remediation. The cybersecurity solution can include a system, method or computer program for remediating the vulnerabilities according to the prioritization determined by the adaptive network security solution.

FIG. 1 shows an example of an environment provided with a cybersecurity solution according to the principles of the disclosure. The environment includes a computer network 10 such as, for example a private network, a private enterprise network, a business network, a corporate network, an academia network, a military network, a government network or any other type of network. The computer network 10 can include thousands, hundreds of thousands, millions or more nodes N. Any one or more of the nodes N in the network 10 can include a computer resource asset that can be connected to an external network (not shown), such as, for example, the Internet, or a communicating device (not shown) that is located internally or externally to the computer network 10. The cybersecurity solution can include one or more vulnerability scanners 20 and an adaptive network security (ANS) appliance 30. The cybersecurity solution can include M vulnerability scanners, where M is a positive integer greater than 1.

The vulnerability scanner(s) 20 and ANS appliance 30 can be arranged as separate devices or modules that are internal or external to the computer network 10, or in a network security system 40 that includes a plurality of computing devices or modules. The network security system 40 can include a computing resource asset such as, for example, a server or a network of servers. The network security system 40 can be located anywhere internal or external to the computer network 10. The ANS appliance 30 can include one or more machine learning platforms, including one or more supervised machine learning platforms or one or more unsupervised machine learning platforms.

As seen in FIG. 1, the computer network 10 can include a plurality of nodes N, including, for example, N1, N2, N21, N22, N23, N3, N31, N32, N33, N4, N41, N42, N43, N44, and N5. The ANS appliance 30 can communicate with the vulnerability scanner(s) 20 and any one or more of the nodes N in the computer network 10. The ANS appliance 30 can receive vulnerability scanning results data from the vulnerability scanner(s) 20. The vulnerability scanning results data can include vulnerability scan report data. The received vulnerability scanning results data can be stored in a database, such as, for example, a database 45 (shown in FIG. 2) or a database 140 (shown in FIG. 4), either or both of which can include a Big Database (for example, an Apache Hadoop database). The ANS appliance 30 can be implemented autonomously, without any human intervention.

The nodes N can include a variety of types of computer resource assets, including, but not limited to, for example, servers, workstations, network devices, IoT devices, Internet Protocol (IP) cameras, third party computing resources, database engines, or programming source code. Each of the types of computer resource assets can be scanned for vulnerabilities by the vulnerability scanner(s) 20 and all resultant vulnerability scanning results can be output by the vulnerability scanner(s) 20 and sent to the ANS appliance 30 as vulnerability scanning results data.

The vulnerability scanner 20 can include any vulnerability scanner, including, for example, commercial off-the-shelf vulnerability scanners capable of scanning the different types of computer resource assets on the network 10. The vulnerability scanner 20 can include any of various types of static vulnerability assessment tools, including commercial off-the-shelf static vulnerability assessment tools. The vulnerability scanner 20 can include, for example, an infrastructure vulnerability scanner, configuration compliance scanner, application vulnerability scanner or source code scanner. The vulnerability scanner 20 can include, for example, any one or more of Static Application Security Testing (SAST) tools, Software Composition Analysis (SCA) tools, Database Security Scanning (DSS) tools, Mobile Application Security Testing (MAST) tools, Interactive Application Security Testing (IAST) tools, Application Security Testing as a Service (ASTaaS) tools, Correlation tools, Test Coverage Analyzer tools, Application Security Testing Orchestration (ASTO) tools, or any static vulnerability assessment tool that can analyze computing resource assets and detect, identify or assess vulnerabilities in those computing resource assets.

The vulnerability scanner(s) 20 can be arranged to directly access the computer resource assets at each node N in the computer network 10, determine computing resource asset configuration issues, missing security patches, cross-site scripting (XSS) injections, structured query language (SQL) injections, command injections, path traversal vulnerabilities, or any other detectable, knowable or known vulnerabilities in the computing resource assets. The vulnerability scanner 20 can log or record each vulnerability in a vulnerability scanning report as vulnerability scanning results data. The vulnerability scanning results data can include an identification of the applicable node N, an Internet Protocol (IP) address, a media access control (MAC) address, or any other information that can uniquely identify the applicable computing resource asset or node. The vulnerability scanning results data can include a description of each vulnerability, type of vulnerability, time of scan, or any other information that can identify the vulnerability or the criticality or significance of the vulnerability to the computer network 10.

The vulnerability scanner(s) 20 can be arranged to scan target computer resource assets on the network 10 and generate vulnerability scanning results data for each scanned computer resource asset or node. The vulnerability scanning results data can include information regarding each vulnerability discovered during the scanning. The vulnerability scanner 20 can be arranged to generate a CVSS score for each vulnerability. The CVSS score can be included, for example, by the vulnerability scanner 20, in the generated vulnerability scanning results data for each discovered vulnerability.

The ANS appliance 30 can be arranged to accurately determine security vulnerabilities in different types of computer resources assets, including predicting false positives in various types of vulnerability scanning results that are generated by the vulnerability scanner 20. The ANS appliance 30 can be arranged to remediate determined vulnerabilities or send remediation instructions and data to a communicating device, such as, for example, a security analyst communicating (SAC) device 47 (shown in FIG. 2), which can be arranged to remediate the vulnerabilities based on the remediation instructions or data, including interacting with a security analyst.

The ANS appliance 30 can receive vulnerability scanning results data from the vulnerability scanner 20, which can assess vulnerabilities in the various types of computer resource assets on the network 10. As noted earlier, the received vulnerability scanning results data can be aggregated or stored in a database such as the database 45 (shown in FIG. 2) or 140 (shown in FIG. 4). One or more vulnerability scanners can be selected or placed online as the vulnerability scanner 20, so that a vulnerability scanner is included that can scan and assess vulnerabilities for each type of computer resource asset in the computer network 10. For instance, the vulnerability scanner(s) 20 can be arranged to scan all workstations, tablets, laptops, servers, databases, source code, software, middleware, web applications, IoT devices, smartphones, printers, facsimile machines, VoIP telephones, and any other type of computer resource asset included in the computer network 10, so as to provide comprehensive or complete coverage for the entire network.

The ANS appliance 30 can be arranged to analyze, assess or process the vulnerability scanning results data and prioritize vulnerabilities for remediation based on the needs of the particular environment, including the computer network 10. The ANS appliance 30 can be arranged to remediate the prioritized vulnerabilities that are determined to exist in the computer network 10, or transmit vulnerability remediation instructions or data to a computing resource asset, such as, for example, the SAC device 47 (shown in FIG. 2), which can be operated or overseen by a security analyst.

Figure 2:
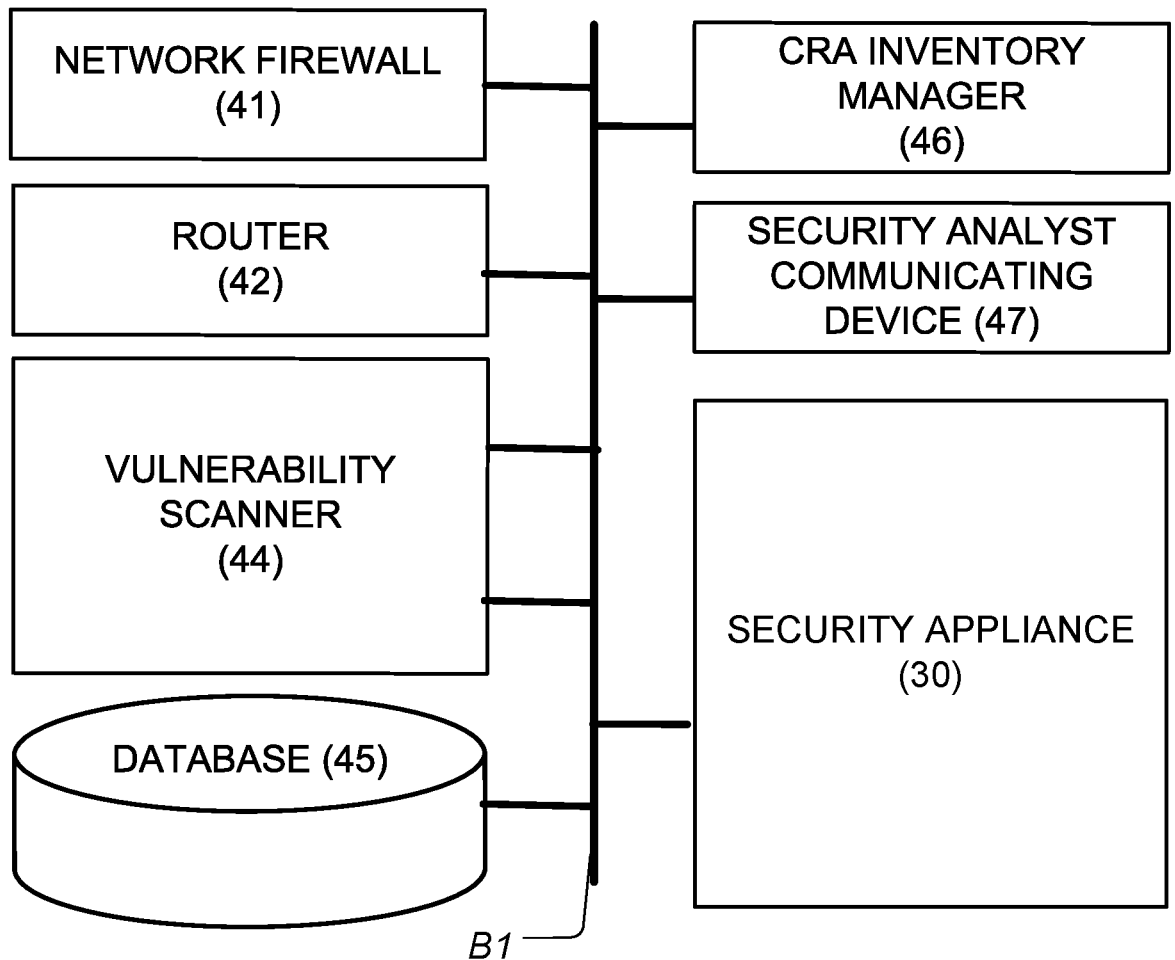
FIG. 2 shows a nonlimiting embodiment of a network security system that can be included in the cybersecurity solution according to the principles of the disclosure.

FIG. 2 shows a nonlimiting embodiment of the network security system 40, arranged according to the principles of the disclosure. The network security system 40 includes the ANS appliance 30. The network security system 40 can include additional computer resource assets that provide security analysis, malware protection, application visibility and control, reporting, secure mobility, and protection against threats that can arise relating to the computer resource assets in the computer network 10 (shown in FIG. 1). The network security system 40 can include a network firewall 41, a router 42, a vulnerability scanner 44, a database 45, and a computer resource asset (CRA) inventory manager 46. The vulnerability scanner 44 can include a single vulnerability scanner 20 (shown in FIG. 1) or a suite of vulnerability scanners 20 (shown in FIG. 1), so as to provide coverage for all the various types of computer resource assets that might exist on the computer network 10. The network security system 40 can include a security analyst communicating (SAC) device 47. The network security system 40 can include a bus B1. Each of the components 30 and 41 to 47 can be connected to the bus B1 by a communication link.

The components 30 and 41 through 47 can be located at various nodes N in the computer network 10. One or more of the components 41 to 47 can be collocated with or incorporated into the ANS appliance 30.

The network security system 40 can be arranged to perform all security tasks for the computer network 10, including predicting vulnerabilities or attacks, detecting vulnerabilities, threats or attacks, identifying or predicting false positives, preventing threats or attacks, monitoring computer resource assets, remediating vulnerabilities in computer resource assets, or responding to threats or attacks.

The network firewall 41 can be arranged to monitor all data traffic incoming into or outgoing from the computer network 10 and log source and destination IP addresses, port numbers, and protocols. The network firewall 41 can monitor connections and data packets for all protocols used by the computer network 10, including transmission control protocol (TCP), user datagram protocol (UDP), Internet control message protocol (ICMP), simple mail transfer protocol (SMTP), or any other protocol for data packets transmitted to, from, or within the computer network 10. The network firewall 41 can log all connections or data packets that are blocked by the firewall, which can be stored as log data locally in the network firewall 41 or in the database 45. The log data can include event data such as, for example, disabled port openings, dropped data packets, dynamic port openings, firewall policies and rules, repeated unsuccessful access attempts by a communicating device having a particular IP address or group of IP addresses, outgoing connections from servers in the computer network 10, or any other event or data that might be useful in identifying vulnerable computing resources in the network.

The network firewall 41 can be arranged to transmit, or it can be arranged to allow computer resource assets such as, for example, the ANS appliance 30, to access the firewall log data. The log data can be provided as one or more computer files (such as, for example, W3C extend log format (.log) files) or a data feed (such as, for example, a rich site summary (RSS) data feed), which can be transmitted at time intervals that are of sufficient frequency or duration to capture and transmit all firewall log data for the computer network 10 to the ANS appliance 30. The log data can include a header section comprising static, descriptive information about the log file or data, as well as available data fields, and a body section that includes compiled data relating to the data traffic that tried to cross the firewall. The log data can be transmitted to or accessed by the ANS appliance 30 as a dynamic list, continuously adding and transmitting (or accessing) the most recent firewall log events as they occur in real-time.

The router 42 can include one or more routing tables, which can include routing table data such as, for example, source IP address, destination IP address, route distance, network topology, network-next hop (or gateway) mapping, and interface IP address. The router 42 can be arranged to transmit, or it can be arranged to be accessed by the ANS appliance 30 to provide routing table data. The routing table data can be provided as one or more computer files or data feeds, which can be transmitted or provided at time intervals that are of sufficient frequency or duration to capture and provide all routing table data for the computer network 10.

The vulnerability scanner 44 can include one or more diverse types of vulnerability scanners 20 (shown in FIG. 1) that, alone or in the aggregate, can be arranged to scan and assess vulnerabilities in all scannable computer resource assets in the computer network 10, or in a targeted portion of the network 10. The vulnerability scanner 44 can include vulnerability scanner(s) that can scan and assess all of the different types of computer resource assets on the computer network 10 (shown in FIG. 1). In the case where multiple vulnerability scanners 20 are included (for example, shown in FIG. 1), the vulnerability scanner 44 can include a unique output for each vulnerability scanner, each of which can output vulnerability scanning results data that can differ in type, format, content, meaning or other properties from the outputs of the other vulnerability scanners. The vulnerability scanning results data can include vulnerability scan reports.

The computer resource asset inventory manager (CRAIM) 46 can be arranged to manage and implement an inventory of all computer resource assets and nodes in the computer network 10. The CRAIM 46 can be arranged to provide a profile for each computer resource asset or node N in the computer network 10. The CRAIM 46 can be arranged to periodically update CRA inventory data for the network 10, which can include the CRA inventory data and historical data for all nodes in the computer network 10. The CRA inventory data can be stored in the database 45 (or the database 140, shown in FIG. 4). The CRA inventory data can include data for each node N, including, for example, CRA configuration data, IP address data, MAC address data, policies, rules, hardware, software, contracts, purchase orders, licenses, warranties, or security features. The security features can include, for example, malware protection, antivirus, status of software patches, types of vulnerabilities scans performed, vulnerability scan date, vulnerability scan results, and security remediation performed.

The SAC device 47 can include a communicating device that is located at a node N on the computer network 10 (shown in FIG. 1). The SAC device 47 can be arranged to interact with or be operated by a security analyst. The SAC device 47 can be located internal or external to the computer network 10. The SAC device 47 can be arranged to perform security vulnerability scanning of computer resource assets at one or more nodes N in the computer network 10 and generate vulnerability scanning results data that summarize the results of the scanning, including security vulnerabilities discovered at each of the scanned computer resource assets.

The SAC device 47 can be arranged to perform penetration testing of the computer resource assets on the computer network 10 and determine security vulnerabilities, which can be logged in an SAC vulnerability scanning results report that can include, for each scanned computer resource asset or node, an IP address, a description of the computer resource asset, the type of computer resource asset, the time of scan, a description of penetration testing performed, the type of security vulnerability discovered, a description of the discovered vulnerability, a description of the remediation (if any) performed or that should be performed, and the time the remediation (if any) was performed or should be performed. The SAC vulnerability scanning results data can be stored in the database 45 (or database 140, shown in FIG. 4).

Each of the vulnerability scanner 44, database 45, CRAIM 46, or SAC device 47, can be arranged to transmit to, or be accessed by the ANS appliance 30 to provide vulnerability scanning results data, CRAIM inventory data, or SAC vulnerability scanning results data to the ANS appliance 30. The data can be provided periodically or continuously.

Figure 3:
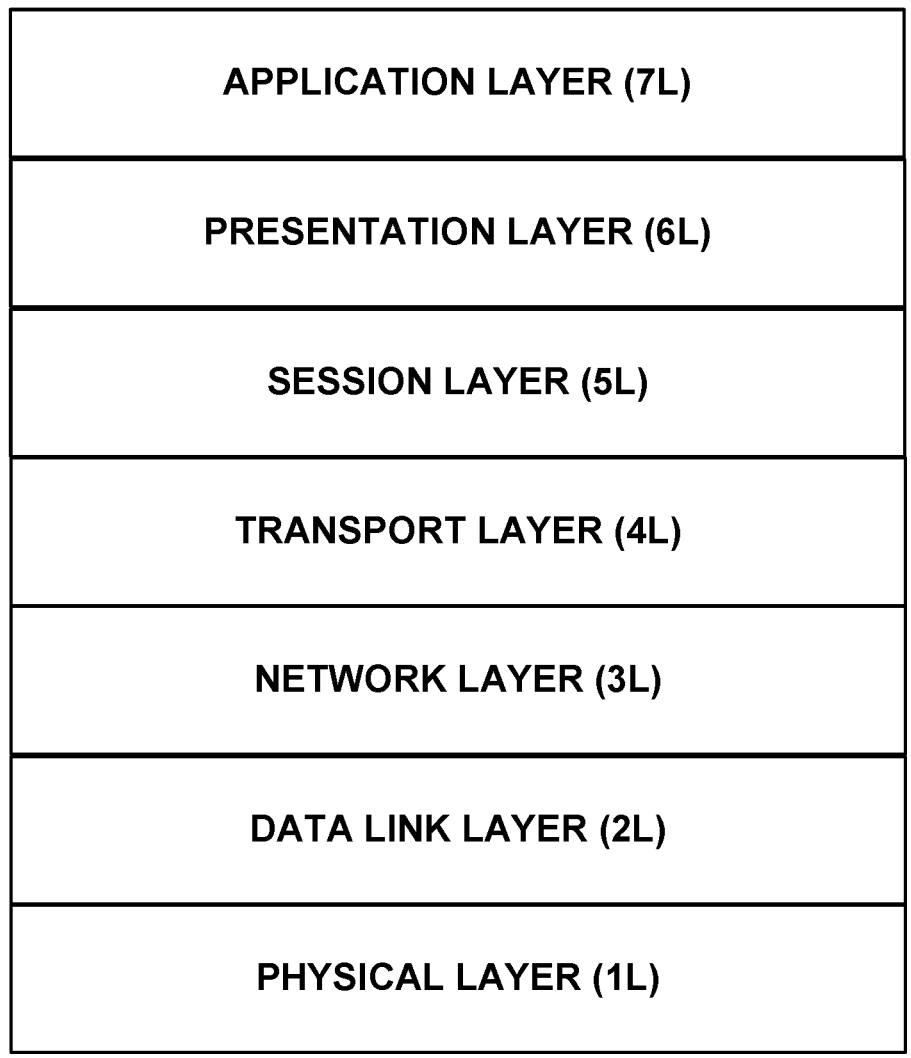
FIG. 3 shows the seven-layer OSI model that can be implemented by computer resource assets in this disclosure.

FIG. 3 shows the seven-layer OSI model that can be implemented by any of the components 30 and 41-47 (shown in FIG. 2). The application layer 7L is the OSI layer in a computer resource asset that is closest to the user. The application layer 7L interacts with computing resources (for example, software applications) in the computer resource asset that implement a communicating component. The application layer 7L can include a computing resource such as, for example, an email application, a web browser, or any other computing resource that an end user can interact with to operate the computer resource asset, including, for example, initiate, control, manage, or terminate functions performed by the computer resource asset.

The presentation layer 6L establishes context between computing resources, which might use different syntax and semantics. The presentation layer 6L transforms data into a form that each computing resource can accept. An operating system is an example of the presentation layer 6L.

The session layer 5L controls the communication connections between computer resource assets in the computer network 10 or between a computer resource asset in the network and a computer resource asset external to the computer network 10. This layer is responsible for establishing, managing and terminating connections between local and remote computing resources. The layer can provide for full-duplex, half-duplex, or simplex operations, and is responsible for establishing checkpointing, adjournment, termination, and restart procedures.

The transport layer 4L provides the functional and procedural mechanisms for transferring variable-length data sequences from a source computer resource asset to a destination computer resource asset, while maintaining quality-of-service (QoS). The transport layer 4L controls the reliability of a given link through flow control, segmentation and desegmentation, and error control. The transport layer 4L can include, for example, tunneling protocols, the Transmission Control Protocol (TCP) and the User Datagram Protocol (UDP).

The network layer 3L provides the functional and procedural mechanisms for transferring data packets from a computer resource asset in a network (for example, a LAN) to another computer resource asset on a different network (for example, a different LAN). If the data to be transmitted is too large, the network layer 3L can facilitate splitting the data into a plurality of segments at the node and sending the fragments independently to the other node, where the segments can be reassembled to recreate the transmitted data. The network layer 3L can include one or more layer-management protocols such as, for example, routing protocols, multicast group management, network layer information and error, and network layer address assignment.

The link layer 2L is responsible for node-to-node transfer between computer resource assets in a communication system. In IEEE 802 implementations, the link layer 2L is divided into two sublayers, consisting of a medium access control (MAC) layer and a logical link control (LLC) layer. The MAC layer is responsible for controlling how computer resource assets in a network gain access to a medium and permission to transmit data. The LLC layer is responsible for identifying and encapsulating network layer protocols, and for controlling error checking and frame synchronization.

The physical layer 1L includes the hardware that connects the computer resource assets in the computer network 10. The hardware can include for example connectors, cables, switches, or any other devices that provide for transmission and reception of instruction and data streams between the computer resource assets.

Figure 4:
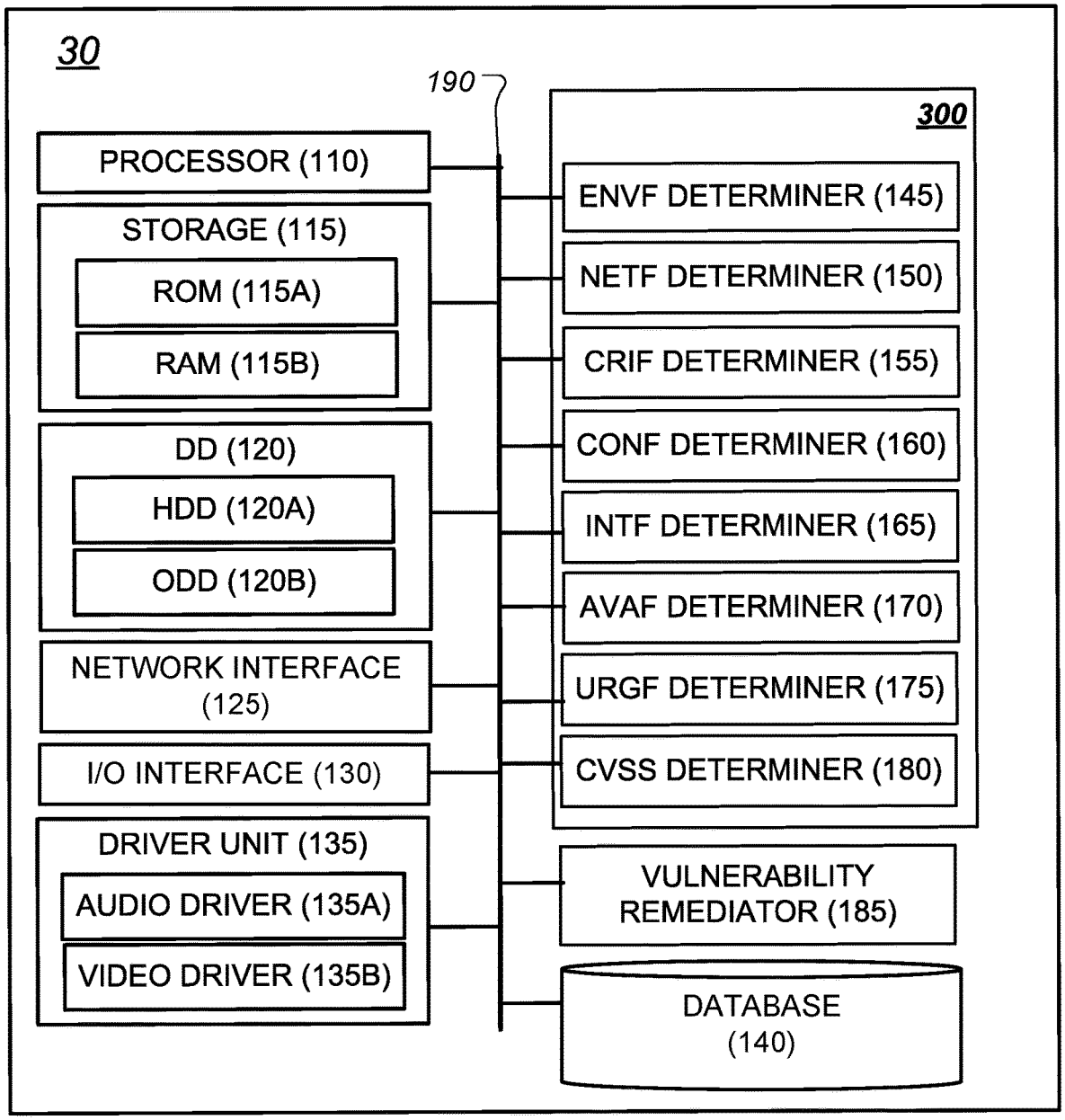
FIG. 4 shows a nonlimiting embodiment of an adaptive network security (ANS) appliance, constructed according to the principles of the disclosure.

FIG. 4 shows a nonlimiting embodiment of the adaptive network security (ANS) appliance 30, constructed according to the principles of the disclosure. The ANS appliance 30 can include a processor 110, a storage 115, a disk drive (DD) 120, a network interface 125, an input/output (I/O) interface 130, a driver unit 135, and a database 140. The ANS appliance 30 can include an environmental factor weighting (EFW) determiner suite 300 that can analyze the vulnerability scanning results data received from the vulnerability scanners (for example, vulnerability scanners 20, shown in FIG. 1; or, vulnerability scanner 44, shown in FIG. 2) with respect to each environmental factor and determine an adaptive weighting factor score value for each analyzed environmental factor. The EFW determiner suite 300 can include an environmental factor (ENVF) determiner 145, a network connectivity factor (NETF) determiner 150, a criticality factor (ORIF) determiner 155, a confidentiality factor (CONF) determiner 160, an integrity factor (INTF) determiner 165, an availability factor (AVAF) determiner 170, an urgency factor (URGF) determiner 175, or a Common Vulnerability Scoring System factor (CVSS) determiner 180. The ANS appliance 30 can include a vulnerability remediator 185. The ANS appliance 30 can include a bus 190, which can be connected by a communication link to each of the components 110 to 185.

Any one or more of the components 115 to 185 can include a computing device or a module that is separate from the processor 110, as seen in FIG. 4, or integrated or integratable in a computing device such as the processor 110.

The EFW determiner suite 300 can include a single computing device or module or a plurality of computing devices or modules.

The ANS appliance 30 can include a sound generation device (not shown), such as, for example, a speaker, a sound pickup device (not shown), such as, for example, a microphone, or a display device (not shown), such as, for example, a light emitting diode (LED) display or a liquid crystal display (LCD). The ANS appliance 30 can include a voice command device (not shown), a smart voice recognition (not shown) or a voice activated device (not shown).

Any one or more of the components 145 through 185 can be implemented as one or more computing devices or machine learning platforms. The machine learning platform can include, for example, an artificial neural network (ANN), a convolutional neural network (CNN), a deep CNN (DCNN), an RCNN, a Mask-RCNN, a deep convolutional encoder-decoder (DCED), a recurrent neural network (RNN), a neural Turing machine (NTM), a differential neural computer (DNC), a support vector machine (SVM), a deep learning neural network (DLNN), Naive Bayes, decision trees, linear regression, Q-learning, temporal difference (TD), deep adversarial networks, fuzzy logic, or any other machine intelligence platform capable of supervised learning.

The processor 110 can include any of various commercially available computing devices, including for example, a central processing unit (CPU), a graphic processing unit (GPU), a general-purpose GPU (GPGPU), a field programmable gate array (FGPA), an application-specific integrated circuit (ASIC), a manycore processor, multiple microprocessors, or any other computing device architecture can be included in the processor 110.

The ANS appliance 30 can include a non-transitory computer-readable storage medium that can hold executable or interpretable computer program code or instructions that, when executed by the processor 110 or one or more of the other components (e.g., computing devices or modules) in the ANS appliance 30, causes the steps, processes or methods in this disclosure to be carried out. The computer-readable storage medium can be included in the storage 115 or DD 120. The computer readable storage medium can include sections or segments of computer program code or instructions that, when executed by one or more components in the ANS appliance 30, can cause the ANS appliance 30 to carry out the processes set forth in or contemplated by this disclosure, including the process steps described below, with reference to FIG. 7.

The storage 115 can include a read only memory (ROM) 115A and a random-access memory (RAM) 115B. A basic input/output system (BIOS) can be stored in the non-volatile memory 115A, which can include, for example, a ROM, an EPROM, or an EEPROM. The BIOS can contain the basic routines that help to transfer information between components in the security appliance 30, such as during start-up. The RAM 115B can include a high-speed RAM such as static RAM for caching data.

The DD 120 can include a hard disk drive (HDD) 120A and an optical disk drive (ODD) 120B. The HDD 120A can include an enhanced integrated drive electronics (EIDE) drive or a serial advanced technology attachments (SATA) drive. The ODD 120B can include a read/write from/to a CD-ROM disk (not shown), or, read from or write to other high capacity optical media such as a digital versatile disc (DVD). The HDD 120A or ODD 120B can be arranged for external use in a suitable chassis (not shown). The DD 120 can be connected to the bus 190 by a hard disk drive interface (not shown) and an optical drive interface (not shown), respectively. The hard disk drive interface (not shown) can include a Universal Serial Bus (USB) (not shown), an IEEE 1394 interface (not shown), and the like, for external applications.

The storage 115 or DD 120, including computer-readable media, can provide nonvolatile storage of data, data structures, and computer-executable instructions. The storage 115 or DD 120 can accommodate the storage of any data in a suitable digital format. The storage 115 or DD 120 can include one or more computing resources such as, for example, program modules or software applications that can be used to execute aspects of the architecture included in this disclosure.

One or more computing resources can be stored in the storage 115 or DD 120, including, for example, an operating system, an application program, an application program interface (API), a program module, or program data. The computing resource can include an API such as, for example, a web API, a simple object access protocol (SOAP) API, a remote procedure call (RPC) API, a representation state transfer (REST) API, or any other utility or service API. One or more of the computing resources can be cached in the RAM 115B as executable sections of computer program code or retrievable data.

The network interface 125 can be connected to a network such as the computer network 10 (shown in FIG. 1) or the Internet (not shown). The network interface 125 can be connected to the computer resource assets in the computer network 10 (shown in FIG. 1), including, for example, multiple vulnerability scanners of different types (such as, for example, vulnerability scanners 20, shown in FIG. 1). The network interface 125 can include a wired or a wireless communication network interface (not shown) or a modem (not shown). When used in a LAN, the ANS appliance 30 can be connected to the LAN through the wired or wireless communication network interface; and, when used in a wide area network (WAN), the ANS appliance 30 can be connected to the WAN network through the modem. The modem (not shown) can be internal or external and wired or wireless. The modem can be connected to the bus 190 via, for example, a serial port interface (not shown).

The (I/O) interface 130 can receive commands and data from an operator. The I/O interface 130 can be arranged to connect to or communicate with one or more input/output devices (not shown), including, for example, a keyboard (not shown), a mouse (not shown), a pointer (not shown), a microphone (not shown), a speaker (not shown), or a display (not shown). The received commands and data can be forwarded from the I/O interface 130 as instruction and data signals via the bus 190 to any component in the ANS appliance 30.

The driver unit 135 can include an audio driver 135A and a video driver 135B. The audio driver 135A can include a sound card, a sound driver (not shown), an interactive voice response (IVR) unit, or any other device necessary to render a sound signal on a sound production device (not shown), such as for example, a speaker (not shown). The video driver 135B can include a video card (not shown), a graphics driver (not shown), a video adaptor (not shown), or any other device necessary to render an image signal on a display device (not shown).

The database 140 can be arranged to store vulnerability scanning results data for the entire computer network 10, or any part of the computer network 10 (shown in FIG. 1). The database 140 can be arranged to be accessed by any one or more of the components 110 to 135 or 145 to 190 in the ANS appliance 30, as well as other computer resource assets, such as, for example, the SAC device 47 (shown in FIG. 2). The database 140 can be arranged to receive queries and, in response, retrieve specific records (or files) or portions of records (or files) based on the queries. The database 140 can include a database management system (DBMS) that can interact with the components 110 to 135 or 145 to 190. The DBMS can be arranged to interact with computer resource assets outside of the ANS appliance 30, such as, for example, the SAC device 47 (shown in FIG. 2). The database 140 can include a DBMS such as, for example, SQL, MySQL, Oracle, Access, or Unix. The database 140 can include a relational database. The database 140 can include the computing resource asset base for the entire computer network 10 (shown in FIG. 1).

FIG. 5 shows a nonlimiting example of an environmental factor weighting (EFW) table 50 having EFW score values that can be determined by the EFW determiner suite 300 (shown in FIG. 4) when analyzing vulnerability scanning results data received from the vulnerability scanner(s) 20 (shown in FIG. 1). The EFW table 50 can include a plurality of columns, including a "FACTOR" column, a "CATEGORY" column and a "SCORE VALUE" column. The FACTOR column can include one or more rows for each environmental factor of the computer network 10 (shown in FIG. 1) to be assessed with respect to the vulnerability scanning results data, including ENVF, NETF, CRIF, CONF, INTF, AVAF, and URGF. The FACTOR column can include a row for the CVSS score. For each FACTOR, the EFW table 50 can include a plurality of CATEGORY descriptors, as seen in FIG. 5, and a respective plurality of SCORE VALUEs, as also seen in FIG. 5. While the nonlimiting example shown in FIG. 5 includes a limited number of discrete levels or bands for each FACTOR or CATEGORY, it is noted that each FACTOR can have two, three, four, five, or more discrete levels or bands of CATEGORIES or SCORE VALUES, so as to allow the ANS appliance 30 to further filter vulnerabilities for remediation based on available resources or time, thereby ensuring that those vulnerabilities that might be most critical to the computer network 10 are identified and resolved or remediated with the greatest degree of urgency.

The ENVF determiner 145 can be arranged to analyze vulnerability scanning results data for computer resource asset and determine whether the computer resource asset is in a production status or a nonproduction status (for example, CATEGORY=PRODUCTION or NONPRODUCTION, shown in FIG. 5). If the computer resource asset is determined to be in a production status, the ENVF determiner 145 can generate a first ENVF score value (for example, "2," shown in FIG. 5) for a vulnerability discovered on the computer resource asset If, however, the computer resource asset is determined to be in a nonproduction status, the ENVF determiner 145 can generate a second, lower ENVF score value (for example, "1," shown in FIG. 5) for the vulnerability discovered on the computer resource asset.

The NETF determiner 150 can be arranged to analyze the vulnerability scanning results data for the computer resource asset and determine whether the asset is connected or connectable to the Internet (for example, CATEGORY=EXTRA NET, shown in FIG. 5), or whether the computer resource asset is only accessible from within the computer network 10 (for example, CATEGORY=INTRANET, shown in FIG. 5). The NETF determiner 150 can be arranged to account for an air gapped network, such as, for example, where the computer resource asset might be physically isolated from an unsecured network, such as, for example, the Internet or an unsecured LAN (for example, CATEGORY=SEPARATE NETWORK, shown in FIG. 5). If the computer resource asset is determined to be accessible from outside the computer network 10 (shown in FIG. 1), the NETF determiner 150 can generate a first NETF score value (for example, "3," shown in FIG. 5) for a vulnerability discovered on the computer resource asset.

If the NETF determiner 150 determines the computer resource asset is only accessible from within the computer network 10 (shown in FIG. 1), it can generate a second, lower NETF score value (for example, "2," shown in FIG. 5) for the vulnerability discovered on the computer resource asset. If, however, the computer resource asset is determined to be only accessible in an air gapped network, then the NETF determiner 150 can be arranged to generate a third, even lower NETF score value (for example, "1," shown in FIG. 5) for the vulnerability discovered on the asset.

The CRIF determiner 155 can be arranged to analyze the vulnerability scanning results data for the computer resource asset and determine whether the asset is critical to the computer network 10 (shown in FIG. 1), so as to account for the criticality of the asset to the network 10 (or organization). If the computer resource asset is determined to be critical to the computer network 10 (for example, CATEGORY=CRITICAL, shown in FIG. 5), then the CRIF determiner 155 can generate a first CRIF score value (for example, "3," shown in FIG. 5) for a vulnerability discovered on the computer resource asset. If, however, the computer resource asset is determined to have medium (for example, CATEGORY=MEDIUM) or low (for example, CATEGORY=LOW) criticality to the computer network 10, then the CRIF determiner 155 can be arranged to generate, respectively, a second, lower CRIF score value (for example, "2," shown in FIG. 5) or a third, still lower score value (for example, "1," shown in FIG. 5) for the vulnerability discovered on the asset.

The CONF determiner 160 can be arranged to reference, for example, the CRA inventory data stored in the database 45 (shown in FIG. 2) or database 140 (shown in FIG. 4) based on the vulnerability scanning results data and determine whether the underlying computer resource asset contains or has access to "confidential data" on the computer network 10. The CRA inventory data can include a confidentiality indicator field that indicates whether the particular computer resource asset contains or has access to, for example, high, medium, or low "confidentiality data." "High confidentiality data" can include, for example, highly confidential data, trade secrets, attorney-client or attorney work product privileged data, proprietary data or any other data that might have strategic, business, personal, or other value to an organization or the computer network 10. Medium and low "confidentiality data" can include, for example, data or information that is, respectively, of lesser or little value or importance to the organization or computer network 10. The CONF determiner 160 can be arranged to analyze the vulnerability scanning results data and, based on the level of "confidential data" contained on or accessible to the underlying computer resource asset, determine a CONF score value of, for example, "2," "1," or "0," depending on whether the "confidential data" level is "high," "medium," or "low," respectively, as seen in the nonlimiting example in FIG. 5.

The INTF determiner 165 can be arranged to reference, for example, the CRA inventory data stored in the database 45 (shown in FIG. 2) or database 140 (shown in FIG. 4) based on the vulnerability scanning results data and determine an integrity level of data the underlying computer resource asset contains or has access to on the computer network 10. The CRA inventory data can include an integrity level indicator field that indicates a level of importance of the integrity of the data contained in or accessible to the computer resource asset. For instance, the integrity level indicator field can include a value of "HIGH," "MEDIUM," or "LOW" (shown in FIG. 5) for each computer resource asset on the network 10, with the "HIGH" level being assigned to those computer resource assets where integrity of the data in the asset is of greatest importance, and "MEDIUM" level being assigned to those computer resource assets where data integrity is important but to a lesser degree than those assets assigned a "HIGH" value, and the rest being assigned a "LOW" level. The INTF determiner 165 can be arranged to analyze the vulnerability scanning results data and, based on the level of integrity level assigned to the underlying computer resource asset, determine a INTF score value of, for example, "2," "1," or "0," depending on the degree of importance of data integrity on or accessible to the asset, as seen in the nonlimiting example in FIG. 5.

The AVAF determiner 170 can be arranged to reference, for example, the CRA inventory data stored in the database 45 (shown in FIG. 2) or database 140 (shown in FIG. 4) based on the vulnerability scanning results data and determine an availability priority level of the underlying computer resource asset, or data contained in the asset, to the computer network 10. The CRA inventory data can include an availability priority level indicator field that indicates a level of importance that the underlying asset be available at all times on the network 10. For instance, the availability priority level indicator field can include a value of "HIGH," "LOW," or "NONE" (shown in FIG. 5) for each computer resource asset on the network 10, with the "HIGH" level being assigned to those computer resource assets that should be available at all times on the computer network 10. The AVAF determiner 170 can be arranged to analyze the vulnerability scanning results data and, based on the availability priority level assigned to the underlying computer resource asset, determine an AVAF score value of, for example, "2," "1," or "0," depending on the level of importance that the computer resource asset be available on the network 10 at all times (for example, as shown in FIG. 5).

The URGF determiner 175 can be arranged to analyze the vulnerability scanning results data and determine an urgency level for the underlying vulnerability or underlying computer resource asset in the analyzed data. The urgency level can be determined based on, for example, the type of vulnerability or asset, and the degree of urgency with which vulnerability should be resolved as compared to other types of vulnerabilities or assets on the network 10.

The URGF determiner 175 can be arranged to reference, for example, the CRA inventory data stored in the database 45 (shown in FIG. 2) or database 140 (shown in FIG. 4) based on the vulnerability scanning results data. The CRA inventory data can include an urgency level indicator field that indicates a level of urgency by which the underlying vulnerability or asset should be remediated. For instance, the urgency level indicator field can include a value of "HIGH" or "LOW" (shown in FIG. 5) for each vulnerability or computer resource asset on the network 10, with the "HIGH" level being assigned to those vulnerabilities or computer resource assets that should be taken out of turn and remediated first, and the rest being assigned a "LOW" level. The URGF determiner 175 can be arranged to analyze the vulnerability scanning results data and, based on the urgency level assigned to the vulnerability or computer resource asset, determine an URGF score value of, for example, "2" or "1" (for example, shown in FIG. 5), depending on the urgency of remediation, which may be based on the risk tolerance posture for the overall computer network 10.

The CVSS determiner 180 can be arranged to analyze the vulnerability scanning results data and parse out CVSS score data or determine a CVSS score based on CVSS data included in the vulnerability scanning results data for the underlying vulnerability. The CVSS determiner 180 can be arranged to receive a security scanning analysis, such as, for example, a UNIX-based, UNIX file-based or any other type of security scanning analysis. The CVSS determiner 180 can be arranged to analyze the vulnerability scanning results data and determine a CVSS score according to CVSS specifications, which are available at <https://first.org/cvss/>.

The vulnerability remediator 185 can be arranged to receive output values from the EFW determiner suite 300, including an output from each of the components 145 to 180, and mitigate or remediate vulnerabilities in the corresponding computer resource assets, including those identified in the vulnerability scanning results data. Alternatively, the vulnerability remediator 185 can be arranged to transmit vulnerability remediation instructions or data to the SAC device 47 (shown in FIG. 2), where the vulnerabilities can be analyzed and remediated according to the vulnerability prioritizations determined by the ANS appliance 30, for example, through interaction with the SAC device 47, which in turn can interact with the corresponding vulnerable computer resource assets to remediate the vulnerabilities. The vulnerability remediator 185 (or SAC device 47) can be arranged to mitigate the vulnerabilities by, for example, but not limited to, implementing patches or fixes to source code in the computer resource assets corresponding to the vulnerabilities, disconnecting the computer resource assets from the computer network 10 (shown in FIG. 1), breaking connectivity links to the computer resource assets, terminating access to the computer resource assets, modifying firewall policies or rules, or modifying router policies or rules.

FIG. 6 shows a nonlimiting example of an implementation of the EFW table 50 (shown in FIG. 5) where the components 145 to 175 (shown in FIG. 4), determine and output minimal score values for ENVF, NETF, CRIF, CONF, INTF, AVAF, AVAF, and URGF factors, but the CVSS determiner 180 (shown in FIG. 4) outputs a maximum score value of 10.

Figure 7:
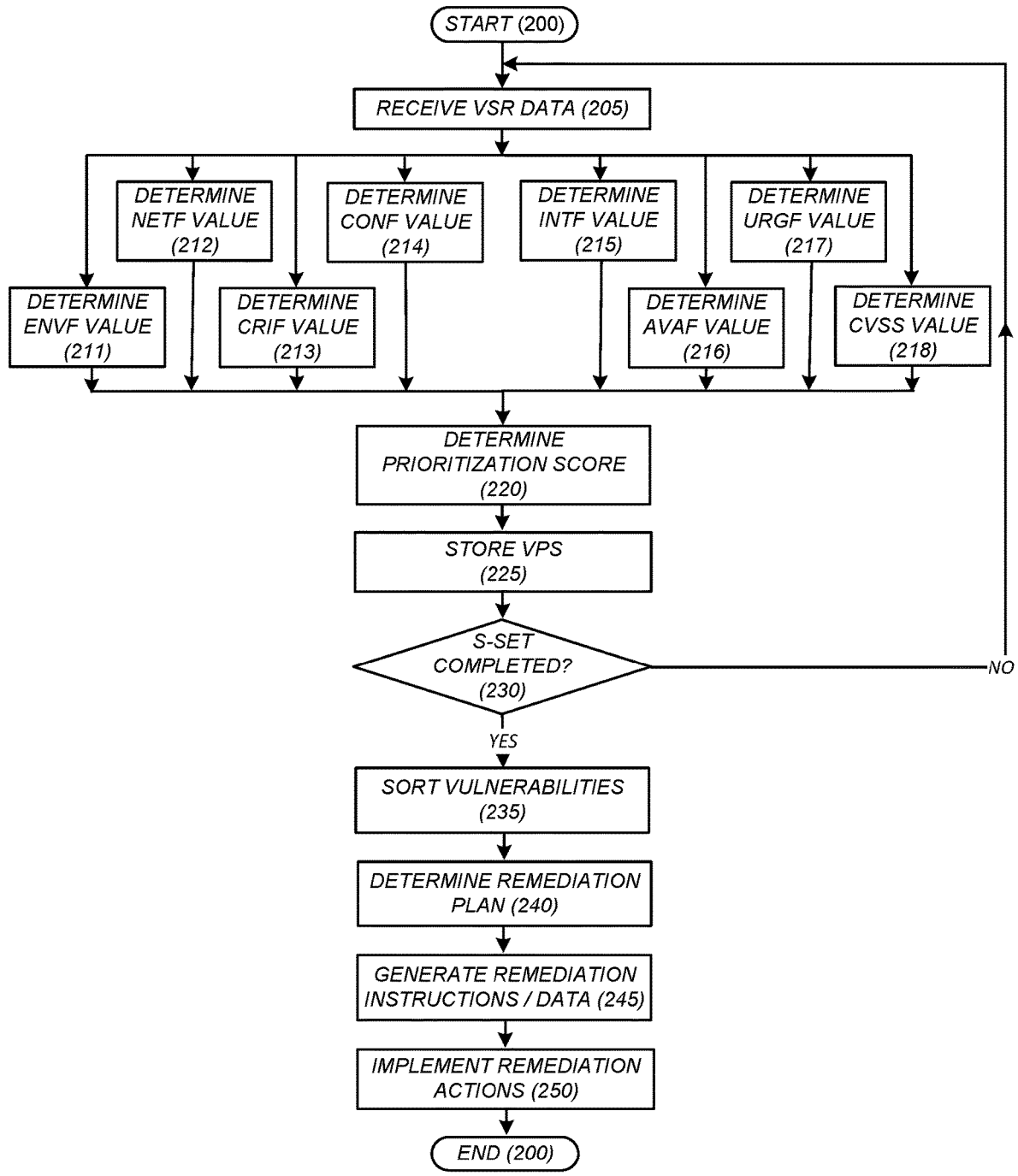
FIG. 7 shows a nonlimiting embodiment of a vulnerability remediation process that can be carried out by the ANS appliance shown in FIG. 4.

FIG. 7 shows a nonlimiting embodiment of an EFW vulnerability remediation process 200, according to the principles of the disclosure. Referring to FIGS. 1, 4 and 7, the ANS appliance 30 can receive vulnerability scanning results (VSR) data from the vulnerability security scanner (Step 205). The VSR data can include vulnerability scanning results data for a vulnerability found to exist on the underlying computer resource asset. The VSR data can be received in real-time from the vulnerability scanner, or the VSR data can be stored in the database 140 (or database 45, shown in FIG. 2) and retrieved from the database (Step 205). The VSR data can be supplied to the processor 110 or database 140. The VSR data can be fed to the input(s) of the EFW determiner suite 300 (shown in FIG. 4). The VSR data can be distributed (for example, via the bus 190, shown in FIG. 4), in parallel or in series, to the components 145 to 180 (Steps 211 to 218). The ANS appliance 30 can store the VSR data in the database 140 and allow the components 145 to 180 (or EFW determiner suite 300) to access the VSR data for analysis.

The VSR data can be analyzed by the EFW determiner suite 300, including each of the ENVF determiner 145 (Step 211), NETF determiner 150 (Step 212), CRIF determiner 155 (Step 213), CONF determiner 160 (Step 214), INTF determiner 165 (Step 215), AVAF determiner 170 (Step 216), URGF determiner 175 (Step 217), and CVSS determiner 180 (Step 218), each of which can determine a respective score value for the vulnerability and forward the ENVF, NETF, CRIF, CONF, INTF, AVAF, URGF, and CVSS score values to the vulnerability remediator 185 (Step 220).

In Step 220, the vulnerability remediator 185 can determine a prioritization score value ($SV_{Total}$) for the vulnerability according to the following relationship:

$$SV_{Total} = \Sigma(SV_{ENVF} + SV_{NETF} + SV_{CRIF} + SV_{CONF} + SV_{INTF} + SV_{AVAF} + SV_{URGF} + SV_{CVSS}) / \Sigma CSV_{Max} \times 100$$

where $SV_{ENVF}$, $SV_{NETF}$, $SV_{CRIF}$, $SV_{CONF}$, $SV_{INTF}$, $SV_{AVAF}$, $SV_{URGF}$, and $SV_{CVSS}$ are score values output by the ENVF determiner 145, NETF determiner 150, CRIF determiner 155, CONF determiner 160, INTF determiner 165, AVAF determiner 170, URGF determiner 175, and CVSS determiner 180, respectively, which are normalized by an aggregate of the maximum score values ($CSV_{Max}$) that can be output by the components 145 to 180. The prioritization score value ($SV_{Total}$) for the vulnerability can be stored in a data record or file corresponding to the underlying computer resource asset (Step 225), such as, for example, in the database 140 (shown in FIG. 4).

Referring to the nonlimiting example shown in FIGS. 5 and 6, the prioritization score value ($SV_{Total}$) for the vulnerability corresponding to the nonlimiting implementation of the EFW table 50 (shown in FIG. 6) is 54 ($SV_{Total}$=54), which can be determined by:

(1) determining a numerator value for the prioritization score value ($SV_{Total}$) equation by aggregating the outputs of the ENVF determiner 145, NETF determiner 150, CRIF determiner 155, CONF determiner 160, INTF determiner 165, AVAF determiner 170, URGF determiner 175, and CVSS determiner 180 (for example, Σ1+1+1+0+0+0+1+10=14);

(2) determining a denominator value by aggregating the maximum score values ($CSV_{Max}$) that can be output by the components 145 to 180 (for example, $CSV_{Max}$=Σ2+3+3+2+2+2+2+10=26);

(3) normalizing the CVSS score and environmental factor weighting score values ENVF, NETF, CRIF, CONF, INTF, AVAF, URGF, CVSS by dividing the numerator value (for example, 14) by the denominator value (for example, 26) and multiplying by 100 to determine the prioritization score value ($SV_{Total}$=54):

$$SV_{Total} = \sum (1 + 1 + 1 + 0 + 0 + 0 + 1 + 10) / \sum CSV_{Max} \times 100$$
$$= 14/26 \times 100 = 54$$

In step 225, the prioritization score value 54 ($SV_{Total}$=54) can be stored for the vulnerability on the computer resource asset that is the subject of the EFW table 50 values (shown in FIG. 6). In a nonlimiting embodiment, the CRA inventory data in the database 45 or CRAIM 46 (shown in FIG. 2) can be modified or updated for each scanned computer resource asset to include the prioritization score value ($SV_{Total}$) determined by the vulnerability remediator 185 (shown in FIG. 4).

A predetermined time-window can be determined for a scanning set (S-SET) of vulnerability scanning results data. The time-window for the S-SET can be set to any period of time, including but not limited to, for example, one hour (or less), one day (24 hours), multiple days (two or more days), one week, or longer. The S-SET can include, for example, all vulnerability scanning results from vulnerability scans that were performed during a twenty-four (24) hour period, beginning at, for example, 00:00 on 24 Dec. 2019 and ending at 23:59 on the same day.

In another example, the S-SET can include all vulnerability scanning results that remain unresolved up to a set time and date, which can include any time and date, including the current time and date in the case of an-going rolling analysis and assessment. In this example, the vulnerabilities can be continuously resorted or reprioritized, such that event the most recently discovered vulnerabilities having the highest prioritization score values ($SV_{Total}$) are continuously placed at the top of the queue for remediation.

After the prioritization value ($SV_{Total}$) is determined (Step 220) and stored (Step 225), a determination can be made whether the S-SET is complete (Step 230). In Step 230, the determination can be made, for example, by the vulnerability remediator 185 (shown in FIG. 4), querying the database 140 (or database 45, shown in FIG. 2) to see if any unanalyzed vulnerability scanning results data exists that has a scanning timestamp within the S-SET time-window. If it is determined that the S-SET is complete (YES at Step 230), then the vulnerabilities can be sorted and prioritized according to their prioritization score values ($SV_{Total}$) (Step 235). If, however, the S-SET is not complete (NO at Step 230), then additional vulnerability scanning results data can be received (Step 205) and analyzed by the EFW determiner suite 300 (Steps 211 to 225).

For instance, based on the determined prioritization score values ($SV_{Total}$) (in Step 220), the vulnerability remediator 185 (shown in FIG. 4) can sort and prioritize all unresolved vulnerabilities on a targeted portion of, or the entire computer network 10 (shown in FIG. 1) for remediation (Step 235). In a nonlimiting example, the vulnerability remediator 185 can access the database 140 (shown in FIG. 4), sort vulnerability scanning results data having timestamps within the S-SET time-window (for example, all unresolved vulnerabilities prior to a set time and date), and prioritize the vulnerabilities in the vulnerability scanning results data according to their determined prioritization score values ($SV_{Total}$).

After sorting and prioritizing (Step 235), a remediation plan can be determined (Step 240). The remediation plan can be created by, for example, the vulnerability remediator 185 (shown in FIG. 4). For instance, a remediation plan can be created for a portion or the entire computer network 10 (shown in FIG. 1) by selecting a subset of all vulnerabilities for remediation. The subset can be selected by, for example, setting a threshold prioritization score value ($SV_{TH}$) for remediation and choosing all vulnerabilities that have a prioritization score value ($SV_{Total}$) that is greater than or equal to the threshold prioritization score value ($SV_{TH}$) for remediation.

Remediation actions can be determined for each of the chosen vulnerabilities based on best practices in the cybersecurity industry at that time (Step 245). For each chosen vulnerability, a remediation action can be determined, for example, by the vulnerability remediator 185, including patches or fixes to source code in the computer resource assets corresponding to the vulnerabilities, disconnecting access to or from the computer resource assets, breaking connectivity links to the computer resource assets, terminating access to the computer resource assets, modifying firewall policies or rules, or modifying router policies or rules. The remediation action can include generating remediation instructions and data, including information about the computer resource asset and the remediation to be applied to the asset (Step 245).

Once determined (Step 245), the remediation actions can be implemented to resolve the corresponding vulnerabilities on the computer resource assets (Step 250). The remediation actions can be implemented according to the remediation plan, remediating the vulnerability or vulnerabilities that have the highest prioritization score value ($SV_{Total}$) first and then proceeded to the vulnerability or vulnerabilities having the next highest value $SV_{Total}$, continuing until all vulnerabilities in the remediation plan have been remediated or resolved.

In Step 250, the vulnerability remediator 185 (shown in FIG. 4) can be arranged to remediate the prioritized vulnerabilities according to the remediation plan, or transmit vulnerability remediation instructions or data to the SAC device 47 (shown in FIG. 2), which remediate or resolve the vulnerabilities based on the instructions or data, such as, for example, through interaction with a security analyst.

The terms "a," "an," and "the," as used in this disclosure, means "one or more," unless expressly specified otherwise.

The term "backbone," as used in this disclosure, means a transmission medium or infrastructure that interconnects one or more computing devices or communication devices to provide a path that conveys data packets and instruction signals between the one or more computing devices or communication devices. The backbone can include a network. The backbone can include an ethernet TCP/IP. The backbone can include a distributed backbone, a collapsed backbone, a parallel backbone or a serial backbone.

The term "bus," as used in this disclosure, means any of several types of bus structures that can further interconnect to a memory bus (with or without a memory controller), a peripheral bus, or a local bus using any of a variety of commercially available bus architectures. The term "bus" can include a backbone.

The term "communicating device," as used in this disclosure, means any computing device, hardware, firmware, or software that can transmit or receive data packets, instruction signals or data signals over a communication link. The communication device can be portable or stationary.

The term "communication link," as used in this disclosure, means a wired or wireless medium that conveys data or information between at least two points. The wired or wireless medium can include, for example, a metallic conductor link, a radio frequency (RF) communication link, an Infrared (IR) communication link, or an optical communication link. The RF communication link can include, for example, WiFi, WiMAX, IEEE 802.11, DECT, 0G, 1G, 2G, 3G, 4G or 5G cellular standards, or Bluetooth. A communication link can include, for example, an RS-232, RS-422, RS-485, or any other suitable interface.

The terms "computer" or "computing device," as used in this disclosure, means any machine, device, circuit, component, or module, or any system of machines, devices, circuits, components, or modules that are capable of manipulating data according to one or more instructions. The terms "computer" or "computing device" include, for example, without limitation, a processor, a microprocessor (X), a central processing unit (CPU), a graphic processing unit (GPU), an application specific integrated circuit (ASIC), a general purpose computer, a super computer, a personal computer, a laptop computer, a palmtop computer, a notebook computer, a desktop computer, a workstation computer, a server, a server farm, a computer cloud, or an array or system of processors, μCs, CPUs, GPUs, ASICs, general purpose computers, super computers, personal computers, laptop computers, palmtop computers, notebook computers, desktop computers, workstation computers, or servers.

The term "computer resource asset," as used in this disclosure, means a computing resource, a computing device or a communication device.

The term "computer-readable medium," as used in this disclosure, means any non-transitory storage medium that participates in providing data (for example, instructions) that can be read by a computer. Such a medium can take many forms, including non-volatile media and volatile media. Non-volatile media can include, for example, optical or magnetic disks and other persistent memory. Volatile media can include dynamic random-access memory (DRAM). Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read. The computer-readable medium can include a "cloud," which can include a distribution of files across multiple (e.g., thousands of) memory caches on multiple (e.g., thousands of) computers.

Various forms of computer readable media can be involved in carrying sequences of instructions to a computer. For example, sequences of instruction (i) can be delivered from a RAM to a processor, (ii) can be carried over a wireless transmission medium, or (iii) can be formatted according to numerous formats, standards or protocols, including, for example, WiFi, WiMAX, IEEE 802.11, DECT, 0G, 1G, 2G, 3G, 4G, or 5G cellular standards, or Bluetooth.

The term "computing resource," as used in this disclosure, means software, a software application, a web application, a web page, a computer application, a computer program, computer code, machine executable instructions, or firmware.

The term "connectivity link," as used in this disclosure, means a communication link or any combination of communication links that connects two or more nodes, carrying data packets between the nodes. A data packet can include an Internet Protocol (IP) data packet. A data packet can include an instruction signal that, when received by a communicating device can cause the device to carry out a predetermined function or task. The data packet can include a data packet signal that, when received by a communicating device can be implemented in carrying out a predetermined function or task, or processed to render information.

The term "database," as used in this disclosure, means any combination of software and/or hardware, including at least one application and/or at least one computer. The database can include a structured collection of records or data organized according to a database model, such as, for example, but not limited to at least one of a relational model, a hierarchical model, or a network model. The database can include a database management system application (DBMS). The at least one application may include, but is not limited to, for example, an application program that can accept connections to service requests from clients by sending back responses to the clients. The database can be configured to run the at least one application, often under heavy workloads, unattended, for extended periods of time with minimal human direction.

The terms "including," "comprising" and variations thereof, as used in this disclosure, mean "including, but not limited to," unless expressly specified otherwise.

The term "network," as used in this disclosure means, but is not limited to, for example, at least one of a personal area network (PAN), a local area network (LAN), a wireless local area network (WLAN), a campus area network (CAN), a metropolitan area network (MAN), a wide area network (WAN), a metropolitan area network (MAN), a wide area network (WAN), a global area network (GAN), a broadband area network (BAN), a cellular network, a storage-area network (SAN), a system-area network, a passive optical local area network (POLAN), an enterprise private network (EPN), a virtual private network (VPN), the Internet, or the like, or any combination of the foregoing, any of which can be configured to communicate data via a wireless and/or a wired communication medium. These networks can run a variety of protocols, including, but not limited to, for example, Ethernet, IP, IPX, TCP, UDP, SPX, IP, IRC, HTTP, FTP, Telnet, SMTP, DNS, ARP, ICMP.

The term "node," as used in this disclosure, means a physical or virtual location in a computer network that comprises or can comprise a computer resource asset.

The term "server," as used in this disclosure, means any combination of software and/or hardware, including at least one application and/or at least one computer to perform services for connected clients as part of a client-server architecture. The at least one server application can include, but is not limited to, for example, an application program that can accept connections to service requests from clients by sending back responses to the clients. The server can be configured to run the at least one application, often under heavy workloads, unattended, for extended periods of time with minimal human direction. The server can include a plurality of computers configured, with the at least one application being divided among the computers depending upon the workload. For example, under light loading, the at least one application can run on a single computer. However, under heavy loading, multiple computers can be required to run the at least one application. The server, or any if its computers, can also be used as a workstation.

Devices that are in communication with each other need not be in continuous communication with each other, unless expressly specified otherwise. In addition, devices that are in communication with each other may communicate directly or indirectly through one or more intermediaries.

Although process steps, method steps, algorithms, or the like, may be described in a sequential or a parallel order, such processes, methods and algorithms may be configured to work in alternate orders. In other words, any sequence or order of steps that may be described in a sequential order does not necessarily indicate a requirement that the steps be performed in that order; some steps may be performed simultaneously. Similarly, if a sequence or order of steps is described in a parallel (or simultaneous) order, such steps can be performed in a sequential order. The steps of the processes, methods or algorithms described herein may be performed in any order practical.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A method for remediating a vulnerability on a computing resource asset located in a computer network that has a plurality of other computing resource assets each having at least one vulnerability, where a Common Vulnerability Scoring System (CVSS) score is determined for said vulnerability, the method comprising:

scanning, using a vulnerability scanner, the computing resource asset and the plurality of other computing resource assets on the computer network;

generating, using the vulnerability scanner, vulnerability scanning results data corresponding to the computing resource asset and the plurality of other computing resource assets on the computer network, the vulnerability scanning results data including the vulnerability and the CVSS score;

receiving, from the vulnerability scanner, the vulnerability scanning results data;

analyzing the vulnerability scanning results data with respect to each of a plurality of environmentally-dependent factors for said computing resource asset or the computer network;

determining an environmental factor weighting score value for each of the plurality of environmentally-dependent factors;

aggregating the environmental factor weighting score values for the plurality of environmentally-dependent factors and the CVSS score to generate an adjusted environmental factor weighting score aggregate value;

determining a prioritization score value for said vulnerability on the computing resource asset according to $$SV_{Total} = \Sigma(SV_{ENVF} + SV_{NETF} + SV_{CRIF} + SV_{CONF} + SV_{INTF} + SV_{AVAF} + SV_{URGF} + SV_{CVSS})/\Sigma CSV_{Max} \times 100,$$

where $SV_{Total}$ is the prioritization score value,
$SV_{ENVF}$ is an environmental factor (ENVF) score value,
$SV_{NETF}$ is a network connectivity factor (NETF) score value,
$SV_{CRIF}$ is a criticality factor (CRIF) score value,
$SV_{CONF}$ is a confidentiality factor (CONF) score value,
$SV_{INTF}$ is an integrity factor (INTF) score value,
$SV_{AVAF}$ is an availability factor (AVAF) score value,
$SV_{URGF}$ is an urgency factor (URGF) score value, and
$SV_{CVSS}$ is a Common Vulnerability Scoring System (CVSS) score value; and remediating said vulnerability on the computing resource asset and the vulnerabilities on each of the plurality of other computing resource assets according to the prioritization score value.

2. The method in claim 1, wherein determining the prioritization score value comprises:

calculating an aggregate maximum score value ($CSV_{Max}$) by adding a maximum value attainable for the CVSS score and all environmentally-dependent factors; and calculating the prioritization score value by normalizing the adjusted environmental factor weighting score aggregate value, wherein normalizing the adjusted environmental factor weighting score aggregate value includes dividing the adjusted environmental factor weighting score aggregate value by the aggregate maximum score value.

3. The method in claim 1, wherein the plurality of environmentally-dependent factors comprise at least one of:
an environmental factor (ENVF);
a network connectivity factor (NETF);
a criticality factor (CRIF);
a confidentiality factor (CONF);
an integrity factor (INTF);
an availability factor (AVAF); and
an urgency factor (URGF).

4. The method in claim 1, wherein remediating said vulnerability on the computing resource asset and the vulnerabilities on each of the plurality of other computing resource assets according to the prioritization score value includes sending remediation instructions or data to a communicating device on the computer network.

5. The method in claim 4, wherein the communicating device is arranged to interact with a user.

6. The method in claim 1, wherein each of the plurality of environmentally-dependent factors comprises at least two categories.

7. The method in claim 3, wherein each of the plurality of environmentally-dependent factors comprise at least two categories, and wherein:
the environmental factor (ENVF) comprises a production category and a non-production category;
the network connectivity factor (NETF) comprises an extranet category, an intranet category and a separate network category; and each of the criticality factor (CRIF), confidentiality factor (CONF), integrity factor (INTF), and availability factor (AVAF) comprise at least three categories.

8. A system for remediating a vulnerability on a computing resource asset located in a computer network that has a plurality of other computing resource assets each having at least one vulnerability, where a Common Vulnerability Scoring System (CVSS) score is determined for said vulnerability, the system comprising:

a vulnerability scanner arranged to
scan the computing resource asset and the plurality of other computing resource assets on the computer network, and
generate vulnerability scanning results data corresponding to the computing resource asset and the plurality of other computing resource assets on the computer network, the vulnerability scanning results data including the vulnerability and the CVSS score;

an environmental factor weighting (EFW) determiner suite arranged to
receive the vulnerability scanning results data from the vulnerability scanner,
analyze the vulnerability scanning results data with respect to each of a plurality of environmentally-dependent factors for said computing resource asset or the computer network, and
determine an environmental factor weighting score value for each of the plurality of environmentally-dependent factors; and a vulnerability remediator arranged to
aggregate the environmental factor weighting score values for the plurality of environmentally-dependent factors and the CVSS score to generate an adjusted environmental factor weighting score aggregate value,
determine a prioritization score value for said vulnerability on the computing resource asset according to $$SV_{Total} = \Sigma(SV_{ENVF} + SV_{NETF} + SV_{CRIF} + SV_{CONF} + SV_{INTF} + SV_{AVAF} + SV_{URGF} + SV_{CVSS})/\Sigma CSV_{Max} \times 100,$$

where $SV_{Total}$ is the prioritization score value,
$SV_{ENVF}$ is an environmental factor (ENVF) score value,
$SV_{NETF}$ is a network connectivity factor (NETF) score value,
$SV_{CRIF}$ is a criticality factor (CRIF) score value,
$SV_{CONF}$ is a confidentiality factor (CONF) score value,
$SV_{INTF}$ is an integrity factor (INTF) score value,
$SV_{AVAF}$ is an availability factor (AVAF) score value,
$SV_{URGF}$ is an urgency factor (URGF) score value, and
$SV_{CVSS}$ is a Common Vulnerability Scoring System (CVSS) score value, and remediate said vulnerability on the computing resource asset and the vulnerabilities on each of the plurality of other computing resource assets according to the prioritization score value.

9. The system in claim 8, wherein the environmental factor weighting (EFW) determiner suite comprises at least one of:
an environmental factor (ENVF) determiner;
a network connectivity factor (NETF) determiner;
a criticality factor (CRIF) determiner;
a confidentiality factor (CONF) determiner;
an integrity factor (INTF) determiner;
an availability factor (AVAF) determiner; and
an urgency factor (URGF) determiner.

10. The system in claim 8, wherein the vulnerability remediator is arranged to determine the prioritization score value by:
calculating an aggregate maximum score value ($CSV_{Max}$) by adding a maximum value attainable for the CVSS score and all environmentally-dependent factors; and
calculating the prioritization score value by normalizing the adjusted environmental factor weighting score aggregate value,
wherein normalizing the adjusted environmental factor weighting score aggregate value includes dividing the adjusted environmental factor weighting score aggregate value by the aggregate maximum score value.

11. The system in claim 8, wherein vulnerability remediator is arranged to send remediation instructions or data to a communicating device on the computer network to remediate said vulnerability on the computing resource asset and the vulnerabilities on each of the plurality of other computing resource assets according to the prioritization score value.

12. The system in claim 11, wherein the communicating device is arranged to interact with a user.

13. The system in claim 8, wherein each of the plurality of environmentally-dependent factors comprises at least two categories.

14. The system in claim 9, wherein each of the plurality of environmentally-dependent factors comprise at least two categories, and wherein:
the environmental factor (ENVF) comprises a production category and a non-production category;
the network connectivity factor (NETF) comprises an extranet category, an intranet category and a separate network category; and
each of the criticality factor (CRIF), confidentiality factor (CONF), integrity factor (INTF), and availability factor (AVAF) comprise at least three categories.

15. A non-transitory computer readable storage medium storing computer program instructions that, when executed by a security appliance, remediate a vulnerability on a computing resource asset located in a computer network that has a plurality of other computing resource assets each having at least one vulnerability, where a Common Vulnerability Scoring System (CVSS) score is determined for said vulnerability, the computer program instructions comprising:
scanning, using a vulnerability scanner, the computing resource asset and the plurality of other computing resource assets on the computer network;
generating, using the vulnerability scanner, vulnerability scanning results data corresponding to the computing resource asset and the plurality of other computing resource assets on the computer network, the vulnerability scanning results data including the vulnerability and the CVSS score;
receiving, from the vulnerability scanner, the vulnerability scanning results data;
analyzing the vulnerability scanning results data with respect to each of a plurality of environmentally-dependent factors for said computing resource asset or the computer network;
determining an environmental factor weighting score value for each of the plurality of environmentally-dependent factors;
aggregating the environmental factor weighting score values for the plurality of environmentally-dependent factors and the CVSS score to generate an adjusted environmental factor weighting score aggregate value;
determining a prioritization score value for said vulnerability on the computing resource asset according to $$SV_{Total} = \Sigma(SV_{ENVF} + SV_{NETF} + SV_{CRIF} + SV_{CONF} + SV_{INTF} + SV_{AVAF} + SV_{URGF} + SV_{CVSS})/\Sigma CSV_{Max} \times 100,$$

where
$SV_{Total}$ is the prioritization score value,
$SV_{ENVF}$ is an environmental factor (ENVF) score value,
$SV_{NETF}$ is a network connectivity factor (NETF) score value,
$SV_{CRIF}$ is a criticality factor (CRIF) score value,
$SV_{CONF}$ is a confidentiality factor (CONF) score value,
$SV_{INTF}$ is an integrity factor (INTF) score value,
$SV_{AVAF}$ is an availability factor (AVAF) score value,
$SV_{URGF}$ is an urgency factor (URGF) score value, and
$SV_{CVSS}$ is a Common Vulnerability Scoring System (CVSS) score value; and
remediating said vulnerability on the computing resource asset and the vulnerabilities on each of the plurality of other computing resource assets according to the prioritization score value.

16. The non-transitory computer readable storage medium in claim 15, wherein the plurality of environmentally-dependent factors comprise at least one of:
an environmental factor (ENVF);
a network connectivity factor (NETF);
a criticality factor (CRIF);
a confidentiality factor (CONF);
an integrity factor (INTF);
an availability factor (AVAF); and
an urgency factor (URGF).

17. The non-transitory computer readable storage medium in claim 15, wherein determining the prioritization score value comprises:
calculating an aggregate maximum score value ($CSV_{Max}$) by adding a maximum value attainable for the CVSS score and all environmentally-dependent factors; and
calculating the prioritization score value by normalizing the adjusted environmental factor weighting score aggregate value,
wherein normalizing the adjusted environmental factor weighting score aggregate value includes dividing the adjusted environmental factor weighting score aggregate value by the aggregate maximum score value.

* * * * *